United States Patent
Yoshioka et al.

(10) Patent No.: US 11,561,161 B2
(45) Date of Patent: Jan. 24, 2023

(54) INFORMATION PROCESSING APPARATUS, INFORMATION PROCESSING METHOD, AND PROGRAM

(71) Applicant: Sony Corporation, Tokyo (JP)

(72) Inventors: Shigeatsu Yoshioka, Kanagawa (JP); Kenji Yamane, Kanagawa (JP); Rei Murata, Kanagawa (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 16/635,827

(22) PCT Filed: Jun. 8, 2018

(86) PCT No.: PCT/JP2018/022092
§ 371 (c)(1),
(2) Date: Jan. 31, 2020

(87) PCT Pub. No.: WO2019/031048
PCT Pub. Date: Feb. 14, 2019

(65) Prior Publication Data
US 2020/0217774 A1 Jul. 9, 2020

(30) Foreign Application Priority Data
Aug. 8, 2017 (JP) .............................. JP2017-152894

(51) Int. Cl.
*G01N 15/14* (2006.01)
*G01N 15/10* (2006.01)
(52) U.S. Cl.
CPC . *G01N 15/1429* (2013.01); *G01N 2015/1006* (2013.01)

(58) Field of Classification Search
CPC ............... G01N 21/64; G01N 15/1429; G01N 2015/1006
See application file for complete search history.

(56) References Cited

U.S. PATENT DOCUMENTS

| 4,622,468 A | 11/1986 | Stefanski et al. |
| 2009/0012721 A1 | 1/2009 | Kimura |

(Continued)

FOREIGN PATENT DOCUMENTS

| CN | 1950690 A | 4/2007 |
| CN | 101956002 A | 1/2011 |

(Continued)

OTHER PUBLICATIONS

International Written Opinion and English translation thereof dated Aug. 21, 2018 in connection with International Application No. PCT/JP2018/022092.

(Continued)

*Primary Examiner* — Eileen M Adams
(74) *Attorney, Agent, or Firm* — Wolf, Greenfield & Sacks, P.C.

(57) ABSTRACT

To provide an information processing apparatus and an information processing method capable of easily calculating an error amount included in a measurement value.
An information processing apparatus includes: an extraction unit configured to extract each parameter variation that affects fluorescence intensity that is measured when a particle is irradiated with a light beam, from a database on the basis of a measurement condition; and a computation unit configured to generate a calculation formula representing an error amount included in the fluorescence intensity on the basis of the extracted each parameter variation.

16 Claims, 9 Drawing Sheets

(56) References Cited

U.S. PATENT DOCUMENTS

| | | |
|---|---|---|
| 2012/0010822 A1 | 1/2012 | Kato et al. |
| 2012/0016616 A1 | 1/2012 | Kato et al. |
| 2012/0056103 A1 | 3/2012 | Sakai |
| 2013/0065269 A1 | 3/2013 | Nitta |
| 2013/0107256 A1 | 5/2013 | Mitsuyama |
| 2013/0226469 A1 | 8/2013 | Robinson et al. |
| 2013/0323825 A1* | 12/2013 | Sekino ............... G01N 15/1429 702/19 |
| 2014/0365159 A1 | 12/2014 | Kato et al. |
| 2016/0103058 A1* | 4/2016 | Glensbjerg ......... G01N 15/1434 382/134 |
| 2019/0212267 A1 | 7/2019 | Kato et al. |

FOREIGN PATENT DOCUMENTS

| | | |
|---|---|---|
| CN | 102235976 A | 11/2011 |
| CN | 102272584 A | 12/2011 |
| CN | 102472738 A | 5/2012 |
| CN | 103454204 A | 12/2013 |
| CN | 104641219 A | 5/2015 |
| CN | 104862273 A | 8/2015 |
| CN | 105074435 A | 11/2015 |
| CN | 106644901 A | 5/2017 |
| DE | 102008011013 A1 | 9/2009 |
| EP | 2 383 554 A1 | 11/2011 |
| EP | 2405252 A2 | 1/2012 |
| EP | 2426481 A1 | 3/2012 |
| JP | 2003-083894 A | 3/2003 |
| JP | 2008-082876 A | 4/2008 |
| JP | 2012-018108 A | 1/2012 |
| JP | 2012-052985 A | 3/2012 |
| JP | 2012047462 A | 3/2012 |
| JP | 2012047594 A | 3/2012 |
| JP | 2013-246140 A | 12/2013 |
| JP | 2015-025824 A | 2/2015 |
| JP | 5772425 B2 | 9/2015 |
| WO | WO 2013/183345 A1 | 12/2013 |

OTHER PUBLICATIONS

International Preliminary Report on Patentability and English translation thereof dated Feb. 20, 2020 in connection with International Application No. PCT/JP2018/022092.

Extended European Search Report dated Jun. 26, 2020 in connection with European Application No. 18842889.0.

Yan Yan et al,, "Comparison of Numerical Methods to Process Data of Myocytes Ca2 + Fluointersity", Journal of Capital University of Medical Sciences, vol. 23, No. 1, Mar. 21, 2002 pp. 20-23.

Paolo Soda,et al. "A multiple expert system for classifying fluorescent intensity in antinuclear autoantibodies analysis", Pattern Analysis Applications, vol. 12 Apr. 22, 2008 .pp. 215-226.

International Search Report and English translation thereof dated Aug. 21, 2018 in connection with International Application No. PCT/JP2018/022092.

* cited by examiner

*FIG. 5*

| CELL TUMOR | Leukocyes | T cells | Helper T-cells | B-cells | Macrophages | Basophils | Dendritic cells | NK Cells | NKT cell subset | Macrophages, basophils |
|---|---|---|---|---|---|---|---|---|---|---|
| ANTIGEN | CD45 | CD3 | CD4 | CD19 | CD33 | CD123 | CD11C | CD335 | CD57 | HLA-DR |
| DYE | Alexa Fluor 532 | PerCP/Cy5.5 | PE-Alexa Fluor 700 | PE/Dazzle 594 | PE/Cy7 | Brilliant Violet 421 | PE | Brilliant Violet 650 | FITC | Pacific Blue |
| ANTIBODY | ... | ... | ... | ... | ... | ... | ... | ... | ... | ... |

INFORMATION PROCESSING APPARATUS, INFORMATION PROCESSING METHOD, AND PROGRAM

CROSS-REFERENCE TO RELATED APPLICATIONS

This is a U.S. National Stage Application under 35 U.S.C. § 371, based on International Application No. PCT/JP2018/022092, filed in the Japanese Patent Office as a Receiving Office on Jun. 8, 2018, entitled "INFORMATION PROCESSING APPARATUS, INFORMATION PROCESSING METHOD, AND PROGRAM", which claims priority under 35 U.S.C. § 119(a)-(d) or 35 U.S.C. § 365(b) to Japanese Patent Application Number JP2017-152894, filed in the Japanese Patent Office on Aug. 8, 2017, each of which applications is hereby incorporated by reference in its entirety.

TECHNICAL FIELD

The present disclosure relates to an information processing apparatus, an information processing method, and a program.

BACKGROUND ART

In fields of medicine, biochemistry, and the like, flow cytometers are generally used in order to promptly measure characteristics of each of a large number of particles. A flow cytometer is a device that irradiates particles such as cells or beads flowing through a flow cell with a light beam, to detect a fluorescence or scattered light generated from the particles and optically measure the characteristics of each particle.

For example, Patent Document 1 below discloses detecting intensity of light in a continuous wavelength band as a fluorescence spectrum, in fluorescence detection of a flow cytometer (fine particle measuring device). In the fine particle measuring device disclosed in Patent Document 1, a fluorescence generated from fine particles is divided with use of a spectral element such as a prism or a grating, and the divided fluorescence is detected by a light-receiving element array in which a plurality of light-receiving elements of different detection wavelength band is arranged.

CITATION LIST

Patent Document

Patent Document 1: Japanese Patent No. 5772425

SUMMARY OF THE INVENTION

Problems to be Solved by the Invention

However, a measurement value measured by the flow cytometer includes various errors due to measurement conditions and the like. Therefore, in order to measure characteristics of measurement target particles more accurately in the flow cytometer, there has been a need for a technique for estimating an error amount included in a measurement value.

Accordingly, the present disclosure proposes a new and improved information processing apparatus, information processing method, and program capable of easily calculating an error amount included in a measurement value.

Solutions to Problems

According to the present disclosure, there is provided an information processing apparatus including: an extraction unit configured to extract each parameter variation that affects fluorescence intensity that is measured when a particle is irradiated with a light beam, from a database on the basis of a measurement condition; and a computation unit configured to generate a calculation formula representing an error amount included in the fluorescence intensity on the basis of the extracted each parameter variation.

Furthermore, according to the present disclosure, there is provided an information processing method including: with use of a computation processing device, extracting each parameter variation that affects fluorescence intensity that is measured when a particle is irradiated with a light beam, from a database on the basis of a measurement condition; and generating a calculation formula representing an error amount included in the fluorescence intensity on the basis of the extracted each parameter variation.

Moreover, according to the present disclosure, there is provided a program for causing a computer to function as: an extraction unit configured to extract each parameter variation that affects fluorescence intensity that is measured when a particle is irradiated with a light beam, from a database on the basis of a measurement condition; and a computation unit configured to generate a calculation formula representing an error amount included in the fluorescence intensity on the basis of the extracted each parameter variation.

According to the present disclosure, it is possible to generate a calculation formula that quantitatively represents an error amount appearing in a measurement result on the basis of a measurement condition, by using a database in which a large number of measurement results or simulation results are accumulated.

Effects of the Invention

As described above, according to the present disclosure, an error amount included in a measurement value can be easily calculated.

Note that the effect described above is not necessarily limited, and in addition to the effect described above or instead of the effect described above, any of the effects described in this specification, or other effects that may be understood from the present specification may be exhibited.

BRIEF DESCRIPTION OF DRAWINGS

FIG. 5 is a table showing an example of measurement conditions to be inputted to an input unit.

MODE FOR CARRYING OUT THE INVENTION

Figure 1:
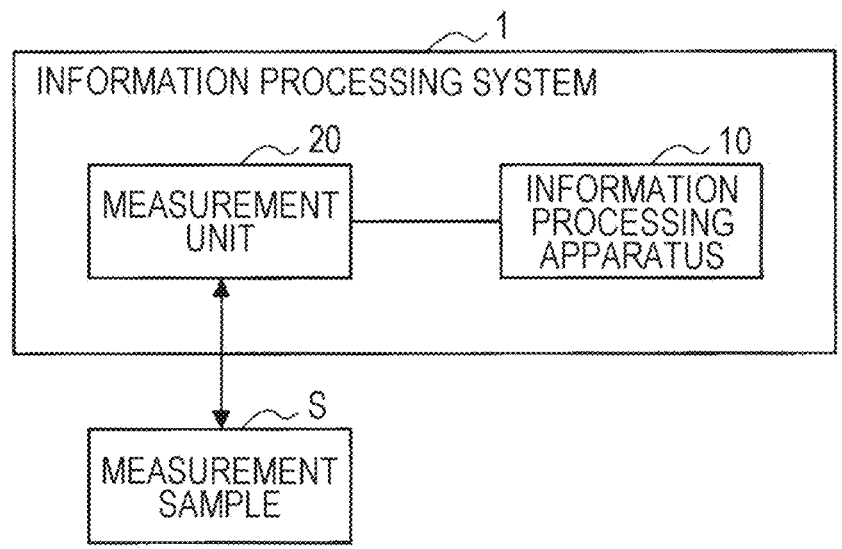
FIG. 1 is a block diagram for explaining an information processing system according to an embodiment of the present disclosure.

Hereinafter, a preferred embodiment of the present disclosure will be described in detail with reference to the accompanying drawings. Note that, in this specification and the drawings, components having substantially the same functional configuration are denoted by the same reference numerals, and redundant explanations are omitted.

Note that the description will be made in the following order.
1. Outline of information processing system
2. Measurement sample
3. Configuration of measurement unit
4. Configuration of information processing apparatus
5. Flow of information processing method
5.1. First example
5.2. Second example
6. Operation example
7. Hardware configuration
8. Conclusion

1. OUTLINE OF INFORMATION PROCESSING SYSTEM

First, an outline of an information processing system according to an embodiment of the present disclosure will be described with reference to FIG. 1. FIG. 1 is a block diagram for explaining the information processing system according to the present embodiment.

As shown in FIG. 1, an information processing system 1 according to the present embodiment includes: a measurement unit 20 configured to acquire measurement data from a measurement sample S; and an information processing apparatus 10 configured to analyze the measurement data acquired by the measurement unit 20. The information processing system 1 according to the present embodiment is used as, for example, a flow cytometer, and more specifically as a cell analyzer, a cell sorter, or the like.

The measurement unit 20 measures a fluorescence, phosphorescence, or scattered light generated from the measurement sample S by irradiating the measurement sample S with a laser light. The measurement unit 20 is only required to measure at least any one of a fluorescence, phosphorescence, or scattered light generated from the measurement sample S. The measurement unit 20 may measure an absorption spectrum of the measurement sample S instead of or in addition to a fluorescence, phosphorescence, and scattered light. Note that, in the following, a description will be given on the assumption that the measurement unit 20 measures at least a fluorescence spectrum of the measurement sample S.

The information processing apparatus 10 determines characteristics and the like of the measurement sample S by analyzing the measurement data of the measurement sample S acquired by the measurement unit 20. A detailed configuration of the information processing apparatus 10 will be described later. Although FIG. 1 illustrates a case where the information processing apparatus 10 and the measurement unit 20 each are provided as separate devices, the technology according to the present disclosure is not limited to such an example. Each function of the information processing apparatus 10 may be provided in a computer that controls an operation of the measurement unit 20, or may be provided in any given computer provided in a housing of the measurement unit 20.

The measurement sample S may be biologically derived particles such as cells, microorganisms, and bio-related particles. The cell may be, for example, an animal cell (for example, a hematopoietic cell), a plant cell, or the like. The microorganism may be, for example, bacteria such as *Escherichia coli*, viruses such as tobacco mosaic virus, fungi such as yeast, or the like. The bio-related particles may be particles included in cells, for example, such as chromosomes, liposomes, mitochondria, or various organelles (cell organelles). Note that the bio-related particles may include bio-related polymers such as nucleic acids, proteins, lipids or sugar chains, or complexes thereof. These biologically derived particles may have either a spherical or non-spherical shape, and a size and mass are not particularly limited.

Furthermore, the measurement sample S may be industrially synthesized particles such as latex particles, gel particles, or industrial particles. For example, the industrially synthesized particles may be: an organic resin material such as polystyrene or polymethyl methacrylate; an inorganic material such as glass, silica, or a magnetic body; or particles synthesized with metal such as gold colloid or aluminum. Similarly, these industrially synthesized particles may have either a spherical or non-spherical shape, and a size and mass are not particularly limited.

2. MEASUREMENT SAMPLE

The measurement sample S may be labeled (stained) with one or more fluorescent dyes prior to the measurement of the fluorescence spectrum. The measurement sample S may be labeled with the fluorescent dye by a known method. Specifically, in a case where the measurement sample S is a cell, the measurement target cell can be labeled with a fluorescent dye by mixing the measurement target cell with a fluorescent-labeled antibody that selectively binds to an antigen present on a cell surface, and binding fluorescent-labeled antibody to the antigen on the cell surface. Alternatively, it is also possible to label the measurement target cell with the fluorescent dye by mixing the measurement target cell with the fluorescent dye to be selectively taken into a specific cell.

The fluorescent-labeled antibody is an antibody to which a fluorescent dye is bound as a label. The fluorescent-labeled antibody may be obtained by directly binding the fluorescent dye to the antibody. Alternatively, the fluorescent-labeled antibody may be obtained by binding an avidin-bound fluorescent dye to a biotin-labeled antibody, by an avidin-biotin reaction. Note that either a polyclonal antibody or a monoclonal antibody can be used as the antibody.

The fluorescent dye for labeling cells is not particularly limited, and at least one or more known dyes used for staining cells and the like can be used. For example, as the fluorescent dye, it is possible to use: phycoerythrin (PE), fluorescein isothiocyanate (FITC), PE-Cy5, PE-Cy7, PE-Texas Red (registered trademark), allophycocyanin (APC), APC-Cy7, ethidium bromide, propidium iodide, Hoechst (registered trademark) 33258, Hoechst (registered trademark) 33342, 4',6-diamidino-2-phenylindole (DAPI), acridine orange, chromomycin, mithramycin, olivomycin, pyronin Y, thiazole orange, rhodamine 101, isothiocyanate, BCECF, BCECF-AM, C.SNARF-1, C.SNARF-1-AMA, aequorin, Indo-1, Indo-1-AM, Fluo-3, Fluo-3-AM, Fura-2, Fura-2-AM, oxonol, Texas Red (registered trademark), rhodamine 123, 10-N-nonyl acridine orange, fluorescein, fluorescein diacetate, carboxyfluorescein, carboxyfluorescein diacetate, carboxydichlorofluorescein, carboxydichlorofluorescein diacetate, or the like. Furthermore, it is also possible to use a derivative and the like of the above-described fluorescent dye.

3. CONFIGURATION OF MEASUREMENT UNIT

Figure 2:
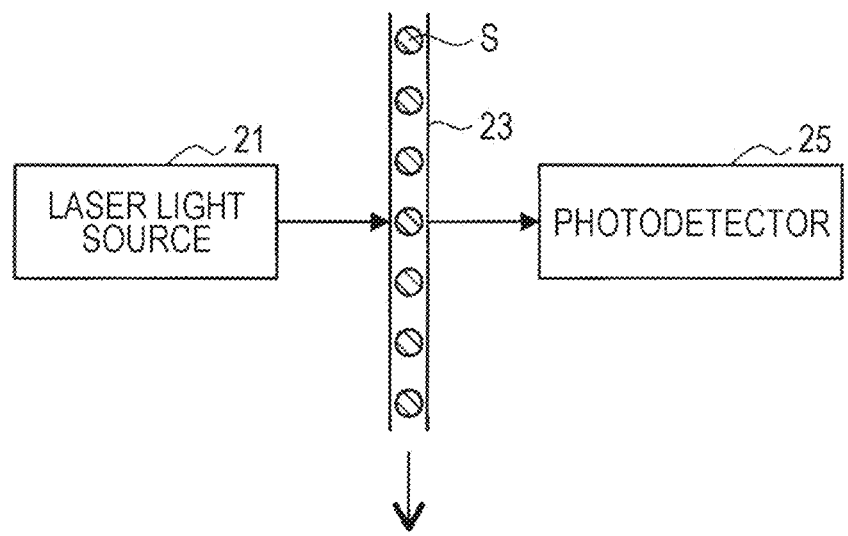
FIG. 2 is a block diagram for explaining a measurement unit provided to the information processing system shown in FIG. 1.
Figure 3:
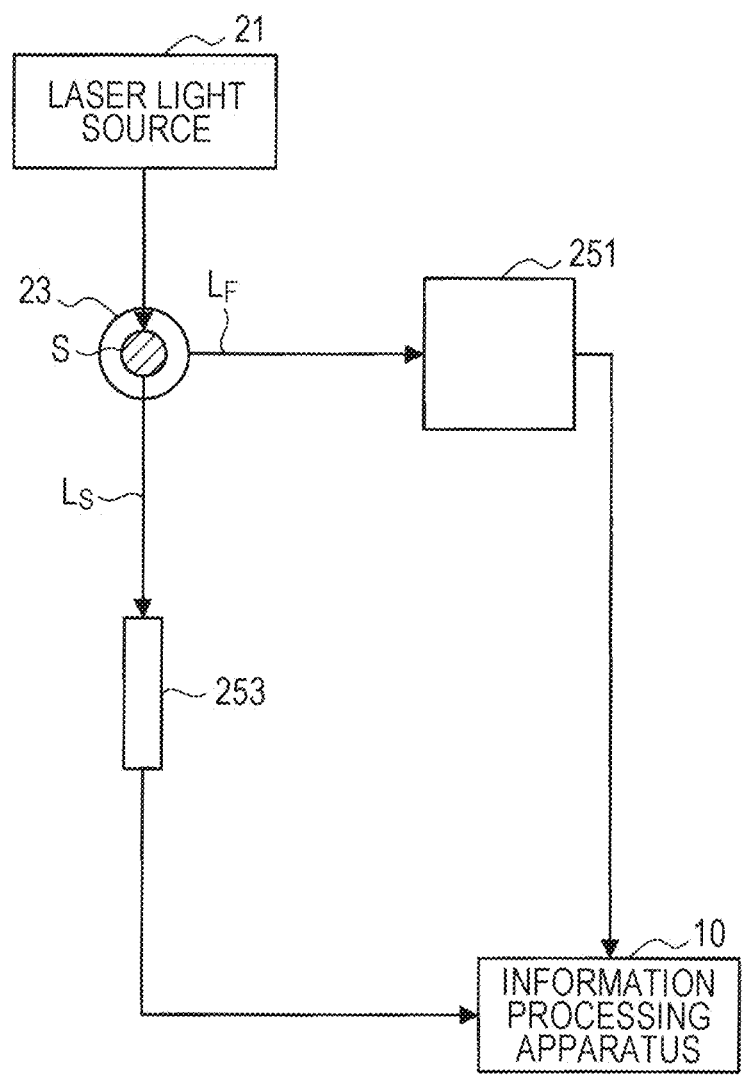
FIG. 3 is a block diagram for explaining the measurement unit provided to the information processing system shown in FIG. 1.

Next, a specific configuration of the measurement unit 20 will be described with reference to FIGS. 2 and 3. FIGS. 2 and 3 are block diagrams for explaining a measurement unit provided to the information processing system shown in FIG. 1.

As shown in FIGS. 2 and 3, the measurement unit 20 includes: a laser light source 21 configured to emit a laser light having a wavelength capable of exciting a fluorescent dye that labels the measurement sample S; a flow cell 23 that allows the measurement sample S to flow in one direction; and a photodetector 25 configured to receive a fluorescence, phosphorescence, or scattered light from the measurement sample S irradiated with the laser light.

The laser light source 21 is, for example, a semiconductor laser light source configured to emit a laser light having a predetermined wavelength. A plurality of laser light sources 21 may be provided. In a case where the plurality of laser light sources 21 is provided, a position to be irradiated with the laser light from the laser light source 21 in the flow cell 23 may be the same or different. However, in a case where different positions are irradiated with the laser light from the plurality of laser light sources 21, it is possible to perform measurement even with a dye that generates light of a near wavelength without mixing, since the light from the measurement sample S can be detected by different photodetectors 25. Note that the laser light emitted from the laser light source 21 may be either pulse light or continuous light. For example, the laser light source 21 may be a plurality of semiconductor laser light sources that individually emits a laser light having a wavelength of 480 nm or 640 nm.

The flow cell 23 is a flow path that allows a plurality of measurement samples S to be aligned and flow in one direction. Specifically, the flow cell 23 allows the plurality of measurement samples S to be aligned and flow in one direction by causing sheath liquid in which the measurement samples S are dispersed to flow as a laminar flow at a high speed.

The photodetector 25 acquires a detection signal by photoelectrically converting a fluorescence, phosphorescence, or scattered light generated from the measurement sample S irradiated with the laser light.

For example, as shown in FIG. 3, the photodetector 25 may include: a detector 253 configured to detect scattered light $L_S$ including forward scattered light and side scattered light from the measurement sample S, and a light-receiving element array 251 configured to detect a fluorescence $L_F$ from the measurement sample S.

The detector 253 may be a known photoelectric conversion element, for example, such as a charge coupled device (CCD) image sensor, a complementary metal oxide semiconductor (CMOS) image sensor, or a photodiode. The light-receiving element array 251 may be configured, for example, by arranging a plurality of independent detection channels having different wavelength bands of light to be detected. Specifically, the light-receiving element array 251 may be a light-receiving element array and the like in which a plurality of photo multiplier tubes (PMTs) or photodiodes having different wavelength bands to be detected are arranged one-dimensionally. The light-receiving element array 251 photoelectrically converts a fluorescence, of the measurement sample S, that has been divided into a continuous spectrum by a spectral element such as a prism or a grating.

In the measurement unit 20, first, each of the measurement samples S passing through the flow cell 23 is irradiated with a laser light emitted from the laser light source 21. The measurement sample S generates scattered light and a fluorescence (in some cases, phosphorescence instead of a fluorescence) by being irradiated with the laser light. Here, the scattered light emitted from the measurement sample S is detected by the detector 253. Whereas, the fluorescence emitted from the measurement sample S is divided into a continuous spectrum by the spectral element and then detected by the light-receiving element array 251.

With the configuration described above, the measurement unit 20 can measure scattered light and a fluorescence from the measurement sample S, and output a measurement result to the information processing apparatus 10.

4. CONFIGURATION OF INFORMATION PROCESSING APPARATUS

Figure 4:
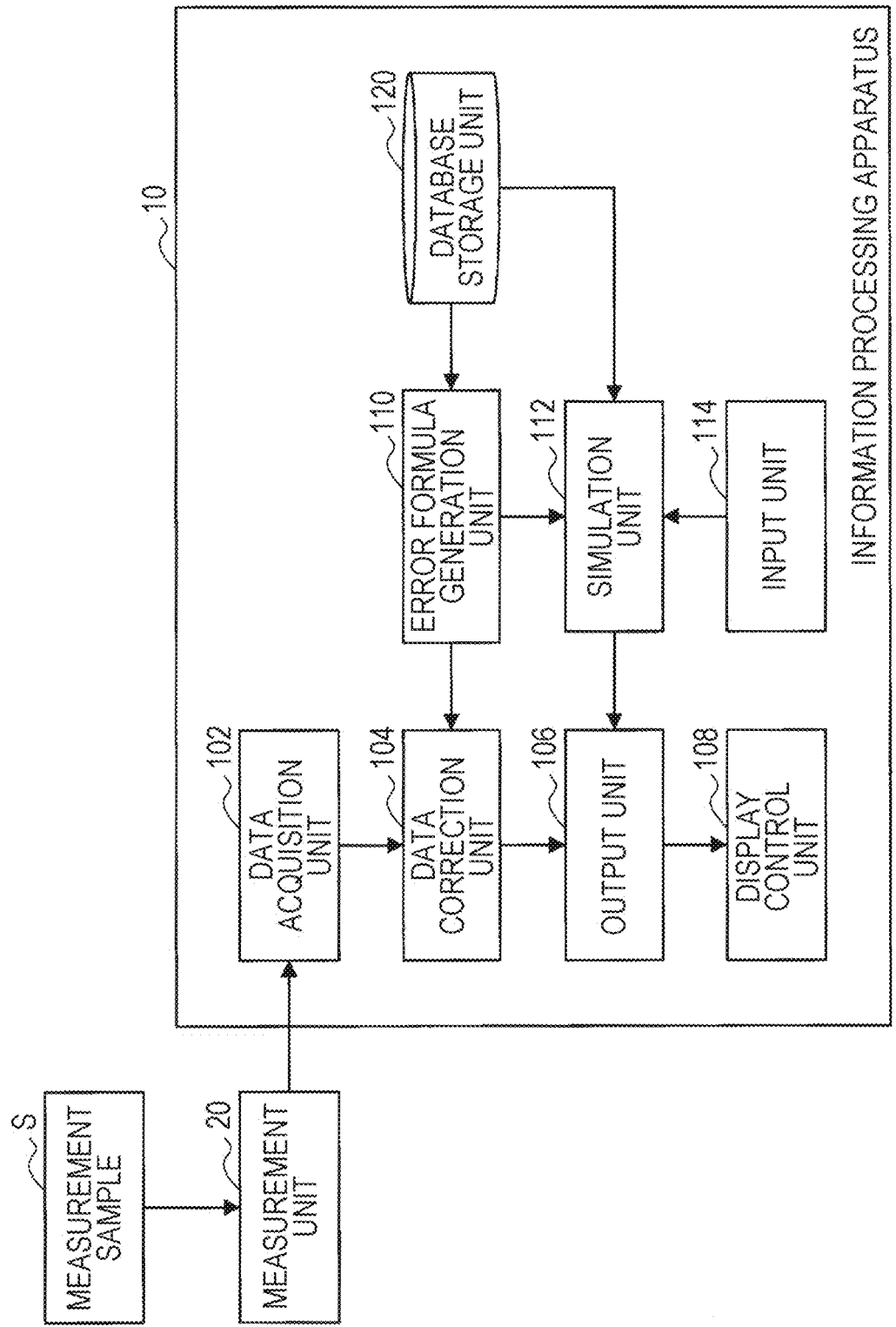
FIG. 4 is a block diagram for explaining an information processing apparatus provided to the information processing system shown in FIG. 1.

Next, a specific configuration of the information processing apparatus will be described with reference to FIG. 4. FIG. 4 is a block diagram for explaining an information processing apparatus provided to the information processing system shown in FIG. 1.

The measurement sample S to be measured by the information processing system 1 according to the present embodiment may be, for example, a sample in which various cell populations are mixed. The information processing system 1 classifies each of the cell populations by detecting a difference in characteristics of each of the cell populations included in the measurement sample S, as a difference in a fluorescence that labels the cell population. Therefore, the information processing system 1 can detect a type and content of each cell population included in the measurement sample S.

However, the measurement result of the measurement sample S acquired by the information processing system 1 includes an error caused by variations of the measurement sample S, an error caused by the measurement unit 20, and the like. Therefore, in a case where these errors are large, boundary of each cell population become blurred as each distribution of the cell population included in the measurement sample S spreads, which may cause a case where proper separation of the individual cell populations is difficult.

The information processing apparatus 10 according to the present embodiment can calculate a calculation formula representing the above-described error included in a measurement result, with the configuration described below. Therefore, the information processing apparatus 10 can remove an error from the measurement result or calculate a simulation result considering the error, by using the calculated calculation formula.

Hereinafter, a specific configuration of the information processing apparatus 10 that realizes the above-described effect will be described with reference to FIG. 4. FIG. 4 is a block diagram for explaining an information processing apparatus provided to the information processing system shown in FIG. 1.

As shown in FIG. 4, the information processing apparatus 10 includes a data acquisition unit 102, a data correction unit 104, an output unit 106, a display control unit 108, an error formula generation unit 110, a simulation unit 112, an input unit 114, and a database storage unit 120.

The input unit 114 acquires information inputted by a user and the like. Specifically, the input unit 114 may acquire measurement conditions for the measurement sample S inputted by a user and the like. For example, the input unit 114 may include: an input device to be inputted with information, such as a touch panel, a keyboard, a mouse, a button, a microphone, a switch, or a lever; and an input control circuit configured to generate an input signal on the basis of the inputted information.

Here, the measurement conditions may include, specifically, information regarding: a type of a cell contained in the measurement sample S; a type of an antigen that the cell has; a type of antibody that binds to the antigen; or a type of a fluorescent dye (that is, label) that binds to the antibody. For example, the measurement conditions may be information as shown in FIG. 5. FIG. 5 is a table showing an example of measurement conditions to be inputted to the input unit 114.

As shown in FIG. 5, in the measurement conditions, for example, various types of hematopoietic cells may be inputted as "cell type". Furthermore, each antigen present on a surface of a cell indicated by "cell type" may be inputted as "antigen". Moreover, a type of antibody that individually binds to "antigen" may be inputted as "antibody", and a name of a fluorescent dye that individually binds to "antibody" may be inputted as "dye".

Note that, in the information processing apparatus 10, in a case where simulation of a measurement result considering an error is executed, for example, some or all of at least any of "antigen", "antibody", or "dye" may not be inputted, among these measurement conditions described above.

In such a case, by setting a plurality of candidate conditions for the conditions that are not inputted, the information processing apparatus 10 may execute simulation of a measurement result considering an error for each case where the candidate conditions are inputted. Thereafter, the information processing apparatus 10 may output, for example, a combination of conditions for reducing an error among the candidate conditions (for example, combinations of types of antigens, antibodies, and dyes) in a ranking format. Note that, as an algorithm for extracting combinations of conditions for reducing an error, for example, an algorithm based on machine learning may be used.

Here, the measurement sample S includes a plurality of cell types. The information processing system 1 can classify and detect a plurality of cell types included in the measurement sample S by staining a plurality of antigens with different antibodies and dyes for each of the plurality of cell types.

For example, in a case of examining combinations of types of antigens, antibodies, and dyes, the basic idea is to improve detection sensitivity by assigning brighter dyes to antigens with low expression amounts. Furthermore, in a case of using a combination of dyes that generate light of a near wavelength for staining a plurality of antigens, it is difficult to separate and detect each of light of a near wavelength with a detection system using a same laser (also referred to as a same deck) because of spectrum overlap. Therefore, it is required to assign a detection system using another laser (also referred to as a separate deck) to a combination of dyes to be used for staining a plurality of antigens.

Therefore, in a flow cytometer that performs multicolor detection, enormous amount of work and time are required to determine a combination for reducing an error of a detection result from a huge number of combinations of antigens, antibodies, and dyes. According to the information processing apparatus 10 according to the present embodiment, it is possible to significantly reduce the amount of work and time required for optimizing the combination of types of antigen, antibody, and dye so as to reduce an error of the detection result.

The error formula generation unit 110 extracts each parameter variation affecting the measurement result of the measurement unit 20 on the basis of measurement conditions, and generates a calculation formula representing an error amount included in a measurement result.

For example, each measurement result by the measurement unit 20 may include an error due to variations in each of the following parameters. Therefore, a measurement result acquired by the measurement unit 20 includes an error in which the variations in each of the following parameters are added together.

Specifically, fluorescence intensity or spectrum acquired by the measurement unit 20 may be affected by variations in an antigen expression amount due to individual differences of cells, variations in affinity of antibody that binds to the antigen, variations in a light quantity due to a fluorescent dye type, variations in a light quantity due to decomposition and the like of a fluorescent dye, photon shot noise caused by a light quantity of a fluorescent dye, electrical noise that occurs at the photodetector 25 of the measurement unit 20, or the like.

Furthermore, in a case where the measurement sample S irradiated with a plurality of laser lights generates a plurality of fluorescences, fluorescence intensity or spectrum acquired by the measurement unit 20 may be mutually affected by the plurality of laser lights and the fluorescence.

For example, depending on the wavelength, the fluorescent dye that binds to the measurement sample S may also be excited by a laser light other than the laser light that is the excitation source, to generate a fluorescence. In such a case, the fluorescence intensity acquired by the measurement unit 20 includes a fluorescence caused by the laser light other than the excitation source, and thus includes an error due to the fluorescence. Furthermore, the fluorescent dye that binds to the measurement sample S does not only generate a fluorescence having a predetermined wavelength, but generates a fluorescence having a wavelength distribution centered on the predetermined wavelength. Therefore, the fluorescence intensity acquired by the measurement unit 20 includes leakage of wavelength distribution of other fluorescent dyes, and thus includes an error due to the leakage.

Therefore, the error formula generation unit 110 generates a calculation formula representing an error amount included in the measurement result acquired by the measurement unit 20, by searching a database for the each parameter variation described above corresponding to the measurement conditions.

Specifically, first, on the basis of inputted measurement conditions, the error formula generation unit 110 individually extracts result data indicating each parameter variation affecting the measurement result, from a database stored in the database storage unit 120. The result data is data indicating each parameter variation under various measurement conditions, and can be obtained by experiments, simulations, theoretical predictions, or the like. For example, the error formula generation unit 110 may search a database for a measurement result (result data) when the measurement is performed under measurement conditions closest to the inputted measurement conditions, and extract the searched measurement result from the database.

Next, the error formula generation unit 110 generates a calculation formula representing an error amount, from each result data extracted from the database. For example, the error formula generation unit 110 may generate a calculation formula representing an error amount by generating a calculation formula representing a curve to be fitted to the variation indicated by the retrieved result data. Thereafter, the error formula generation unit 110 adds the generated calculation formulas to generate a calculation formula representing an error amount included in the measurement result.

Note that the error formula generation unit 110 is only required to search the database for result data indicating variations of at least one or more parameters. The number of parameters for which the result data is searched for by the error formula generation unit 110 is not particularly limited.

As a method for generating a calculation formula representing an error amount from the result data, a known method such as a least square method can be used. For example, a method using machine learning may be used. Specifically, as machine learning, reinforcement learning, deep learning, neural network, support vector machine (SVM), genetic algorithm (GA), Bayesian inference, or the like can be used alone or in appropriate combination.

The database storage unit 120 stores a database obtained by accumulating result data that theoretically or experimentally indicates each parameter variation affecting a measurement result acquired by the measurement unit 20.

Specifically, the database stored in the database storage unit 120 may be, for example, a data collection obtained by accumulating experimental data, simulation data, theoretical prediction data, and the like indicating each parameter variation for various measurement conditions.

Figure 6:
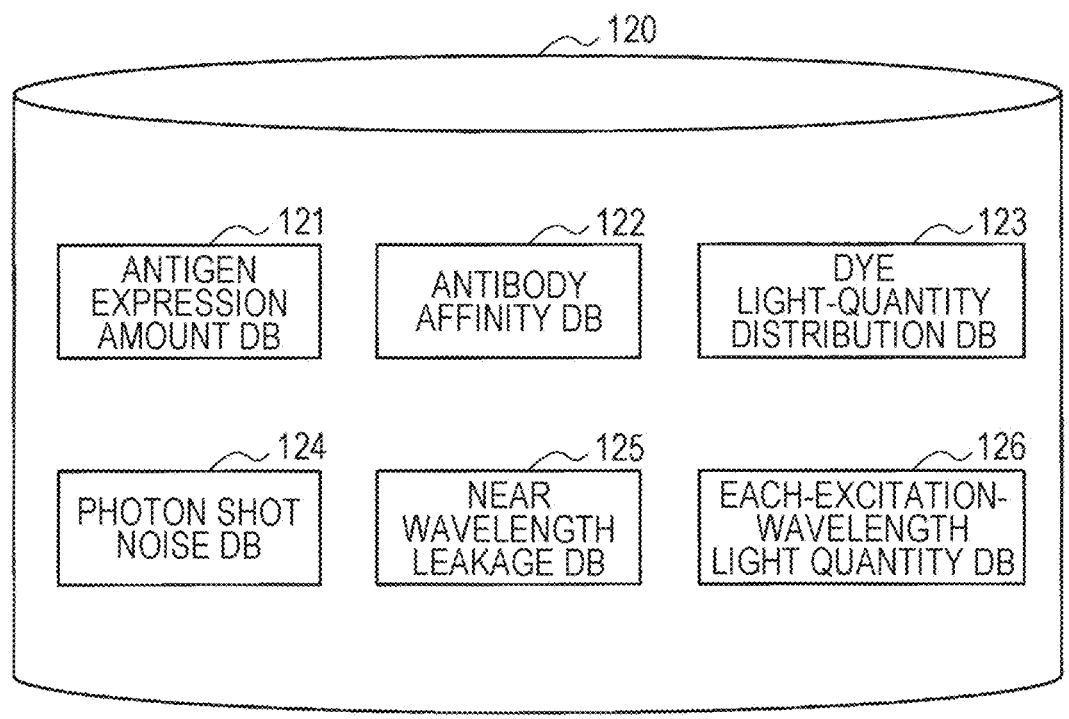
FIG. 6 is a block diagram showing a specific example of a database stored in a database storage unit.

Here, a database stored in the database storage unit 120 will be described with reference to FIG. 6. FIG. 6 is a block diagram showing a specific example of a database stored in the database storage unit 120.

As shown in FIG. 6, for example, the database storage unit 120 may store an antigen expression amount database (DB) 121, an antibody affinity DB 122, a dye light-quantity distribution DB 123, a photon shot noise DB 124, a near wavelength leakage DB 125, and an each-excitation-wavelength light quantity DB 125.

The antigen expression amount DB 121 is, for example, a database obtained by accumulating data indicating distribution of an expression amount of each antigen with respect to a cell type. The antigen expression amount DB 121 may also accumulate data indicating distribution of an expression amount of each antigen with respect to an individual difference between cells of a same type. Note that the antigen expression amount DB 121 may store a Skewed Gaussian distribution since it is known that the distribution of the expression amount of each antigen with respect to the individual difference of cells of a same type generally follows the Skewed Gaussian distribution.

The antibody affinity DB 122 is, for example, a database obtained by accumulating data indicating distribution of affinity of each antibody with respect to an antigen type. The dye light-quantity distribution DB 123 is, for example, a database obtained by accumulating data indicating light quantity distribution with respect to a fluorescent dye type.

The photon shot noise 124 is, for example, a database obtained by accumulating data indicating a degree of photon shot noise of the photodetector 25 with respect to a light quantity of a fluorescent dye. The near wavelength leakage DB 125 is, for example, in a case where the measurement unit 20 detects a plurality of fluorescences of different wavelengths, a database obtained by accumulating data indicating a degree of mutual leakage of a part of wavelength distribution of each of the plurality of fluorescences. The each-excitation-wavelength light quantity DB 126 is, for example, a database obtained by accumulating data indicating a light quantity of a fluorescent dye for each excitation wavelength. According to the each-excitation-wavelength light quantity DB 126, in a case where a plurality of fluorescent dyes is excited by a plurality of laser lights, it is possible to determine how much the fluorescent dyes are to generate a fluorescence by a laser light that is not an excitation source.

Note that, it is needless to say that the database storage unit 120 may store a database obtained by accumulating data regarding variations in other parameters affecting the measurement result, in addition to the database exemplified above. Furthermore, the database storage unit 120 may be provided inside the information processing apparatus 10, but may be provided in an external device connected to the information processing apparatus 10 via a network and the like.

The simulation unit 112 simulates a measurement result of the measurement sample S on the basis of a calculation formula generated by the error formula generation unit 110. Specifically, the simulation unit 112 generates simulation data of the measurement result of the measurement sample S for a type of cell contained in the measurement sample S, by performing Monte Carlo simulation using distribution of an antigen expression amount of each cell type, an error amount calculation formula, and a random number. Thereafter, the simulation unit 112 classifies each cell population of the simulation data by applying any given clustering algorithm to the generated simulation data.

Moreover, the simulation unit 112 may evaluate a degree of accuracy and precision with which each of the cell populations can be classified by any given clustering algorithm in the simulation data. For example, the simulation unit 112 may evaluate whether or not each of the cell populations included in the measurement sample S can be classified in accordance with inputted measurement conditions. The simulation unit 112 may evaluate the accuracy and precision of each classification of cells in the simulation data with a score of 0 to 100 (assuming that a larger numerical value indicates higher accuracy and precision). Furthermore, the simulation unit 112 may evaluate validity of the measurement conditions on the basis of the accuracy and precision of each classification of cells in the simulation data.

In addition, for each parameter variation to be an error factor, the simulation unit 112 may evaluate a degree to which each parameter variation contributes to an error of a final measurement result. The degree to which each parameter variation to be an error factor contributes to the error of the final measurement result can be evaluated, for example, at a time of generating a calculation formula representing an error in the error formula generation unit 110. Therefore, in order to prompt improvement of an error included in the measurement result, the simulation unit 112 may extract a parameter that contributes most to the error included in the final measurement result from each parameter to be an error factor, and present the extracted parameter. Furthermore, the simulation unit 112 may present, for every parameter, a degree of contribution of each parameter variation to be an error factor to an error of the final measurement result.

Note that, for a specific algorithm for the simulation performed by the simulation unit 112, a known method other than the above-described method may be used. For example, the simulation unit 112 may generate simulation data of the measurement result of the measurement sample S by a simulation method other than the Monte Carlo simulation. Furthermore, the simulation unit 112 may classify each of the cell populations of the simulation data with a classifier other than the clustering algorithm.

The data acquisition unit 102 acquires the measurement result of the measurement sample S from the measurement unit 20. Specifically, the data acquisition unit 102 acquires, from the measurement unit 20, a measurement result regarding intensity or a spectrum of a fluorescence generated from the measurement sample S. The data acquisition unit 102 may include, for example, an external input interface configured with a connection port or a communication device for connection with the measurement unit 20. The data acquisition unit 102 may acquire information from the measurement unit 20 either wirelessly or by wire.

The data correction unit 104 corrects a measurement result of the measurement sample S on the basis of a calculation formula generated by the error formula generation unit 110. Specifically, the data correction unit 104 removes an error represented by the calculation formula generated by the error formula generation unit 110, from the measurement result regarding a spectrum or intensity of the fluorescence generated from the measurement sample S. For example, the data correction unit 104 may regard the measurement result of the measurement sample S as a composite function of a function representing a measurement result of a true value and a function representing an error, and use the calculation formula generated by the error formula generation unit 110 to remove a function representing an error from the measurement result of the measurement sample S. According to this configuration, the data correction unit 104 can obtain a measurement result with less variation and higher accuracy, by correcting the measurement result of the measurement sample S.

The output unit 106 outputs a prediction result by the simulation unit 112 or a measurement result after correction by the data correction unit 104, to the display control unit 108, an external device, or a medium, and the like. The output unit 106 may include, for example, a writing device for various storage media, or an external output interface configured with a connection port or a communication device for connection with an external device. For example, the output unit 106 may output information as printed matter to a user via an output device such as a printer, or may output information as an image to the user via a display device such as a display.

The display control unit 108 controls the information outputted from the output unit 106 and a display screen displayed on a display device provided in the information processing apparatus 10 or a display device provided outside the information processing apparatus 10. For example, by generating and controlling an image for presenting the measurement result or simulation result outputted from the output unit 106 to the user of the information processing system 1, the display control unit 108 displays the image on a display device such as a display.

An example of the specific configuration of the information processing apparatus 10 according to the present embodiment has been described above. As will be described later, the configuration of the information processing apparatus 10 according to the present embodiment is realized by information processing through cooperation between software and hardware.

According to such an information processing apparatus 10, the possibility of finding new knowledge on the basis of the measurement result can be improved, since a measurement result with higher accuracy and precision can be obtained by correcting an error. Furthermore, since the information processing apparatus 10 can predict a measurement result for a measurement condition as simulation data in consideration of an error, optimal measurement conditions can be searched in advance by simulation. According to this configuration, the user can save a specimen, time, a reagent, and the like for examining the measurement conditions. Furthermore, since the information processing apparatus 10 can reduce an error included in the measurement result to be equal to or less than a threshold value, reproducibility and quantitativeness of the measurement can be improved.

5. FLOW OF INFORMATION PROCESSING METHOD

Figure 7:
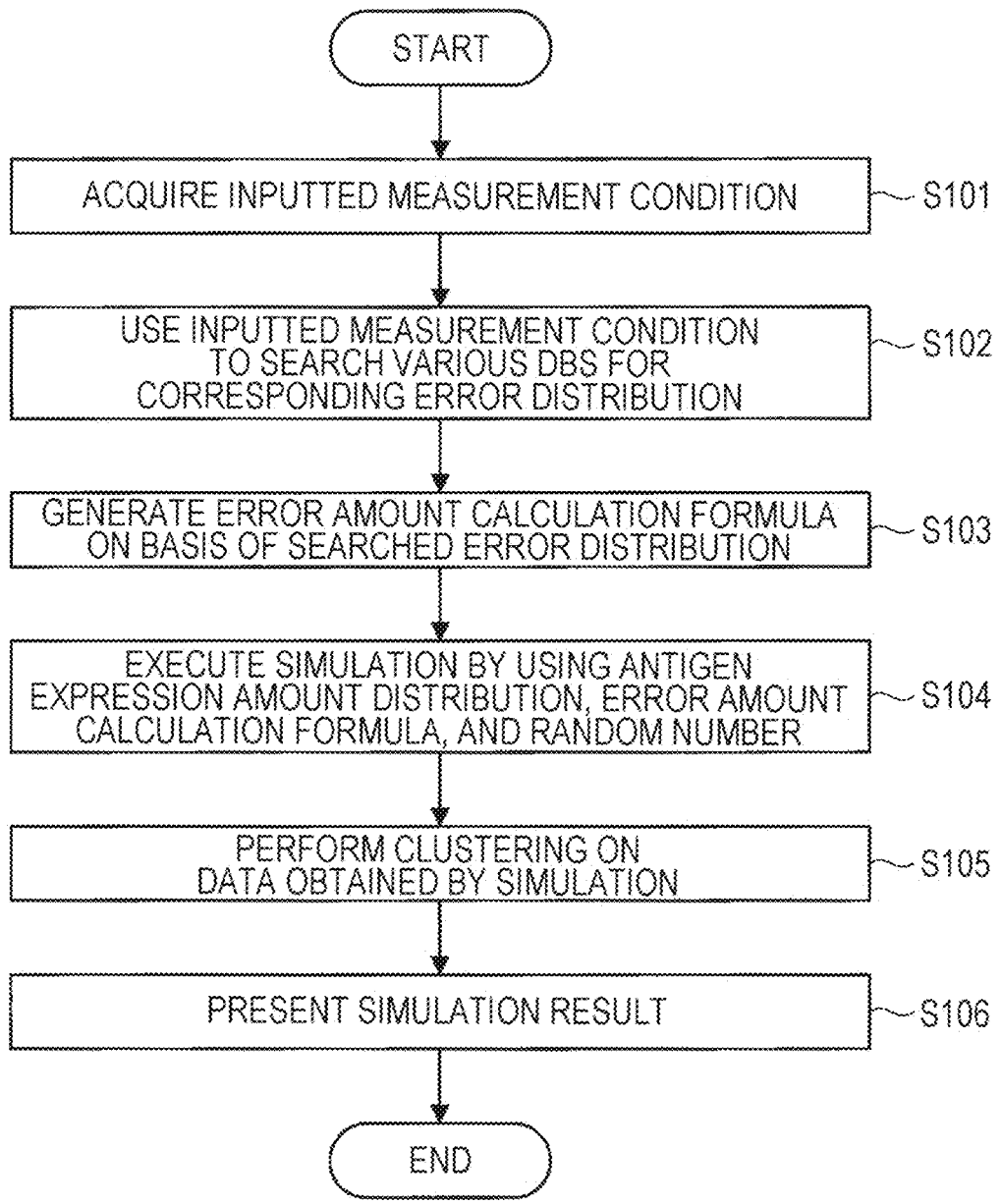
FIG. 7 is a flowchart for explaining a first example of an information processing method.
Figure 8:
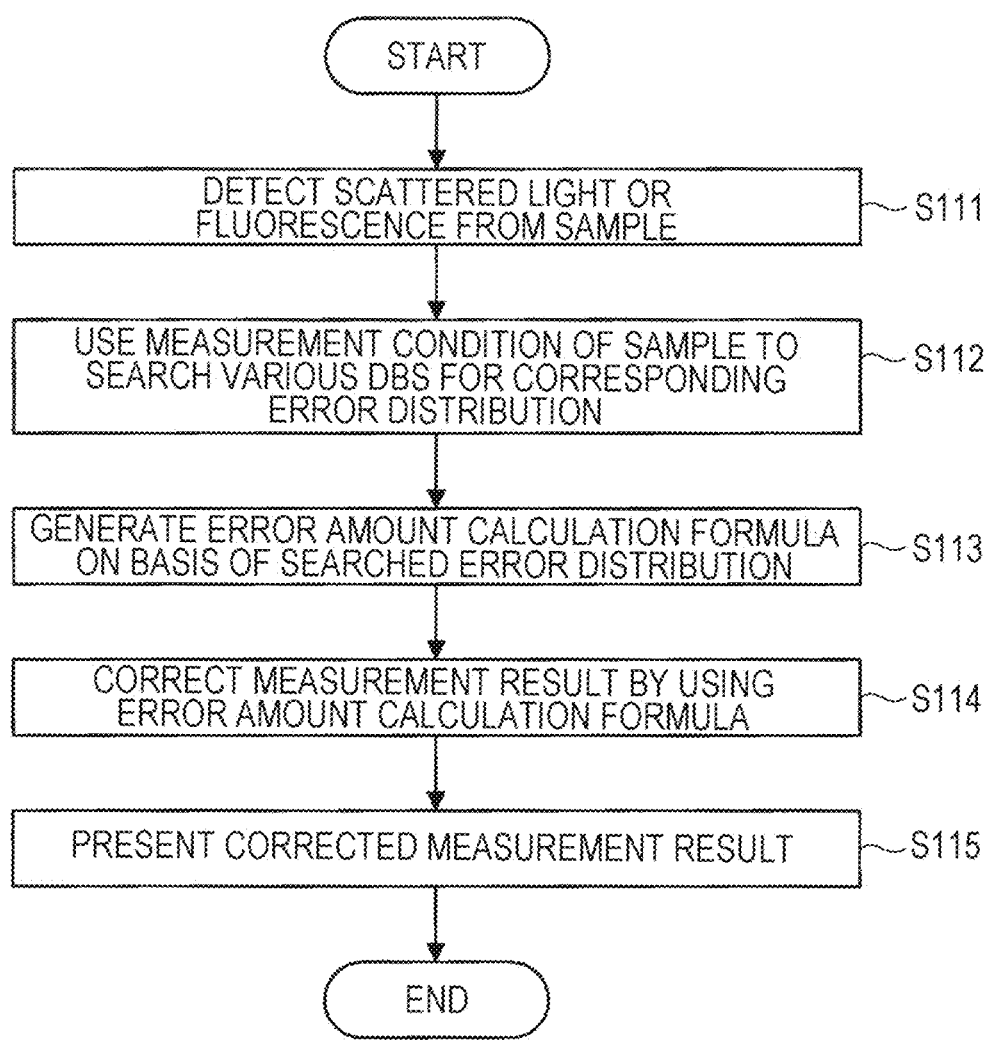
FIG. 8 is a flowchart for explaining a second example of the information processing method.

Next, referring to FIGS. 7 and 8, a flow of an information processing method executed by the information processing apparatus 10 will be described separately for a first example (measurement result simulation method) and a second example (measurement result correction method). FIG. 7 is a flowchart for explaining the first example of the information processing method, and FIG. 8 is a flowchart for explaining the second example of the information processing method.

5.1. First Example

First, the first example of the information processing method will be described with reference to FIG. 7. The first example of the information processing method according to the present embodiment is a method of simulating a measurement result with use of a generated calculation formula representing an error.

As shown in FIG. 7, in the first example, first, the information processing apparatus 10 acquires measurement conditions inputted via the input unit 114 (S101). Note that the measurement conditions include a cell type, an antigen type, an antibody type, and a fluorescent dye type, as shown in FIG. 5.

Subsequently, the error formula generation unit 110 uses the inputted measurement conditions to search various databases for error distribution corresponding to the measurement conditions (S102). Thereafter, the error formula generation unit 110 generates an error amount calculation formula on the basis of the searched error distribution (S103).

Specifically, first, the error formula generation unit 110 searches a database (for example, the antigen expression amount DB 121) for distribution of an expression amount of each antigen for each measurement target cell. Next, the error formula generation unit 110 uses information regarding an antibody type for each antigen, to search a database (for example, the antibody affinity DB 122) for relative binding rate distribution of the antibody for the antigen (that is, distribution expressed as a ratio to an average binding rate). Subsequently, the error formula generation unit 110 uses information regarding a fluorescent dye type for each antigen, to search a database (for example, the dye light-quantity distribution DB 123) for relative intensity distribution of a light quantity of a fluorescent dye (that is, distribution expressed as a ratio to an average light quantity). Thereafter, the error formula generation unit 110 calculates absolute value distribution of the light quantity of the fluorescent dye by using the expression amount distribution of the antigen, the relative binding rate distribution between the antigen and the antibody, and the relative intensity distribution of the light quantity of the fluorescent dye. Moreover, the error formula generation unit 110 uses the calculated absolute value distribution of the light quantity of the fluorescent dye, to search a database (for example, the photon shot noise DB 124) for photon shot noise distribution corresponding to the light quantity.

Furthermore, in a case where a plurality of fluorescent dyes is excited using a plurality of laser lights, the error formula generation unit 110 uses information regarding the fluorescent dye type for the antigen, to search a database (for example, the near wavelength leakage DB 125) for distribution of a leakage amount of a fluorescence from the fluorescent dye of the near wavelength. Moreover, the error formula generation unit 110 uses information regarding the fluorescent dye type for the antigen, to search a database (for example, the each-excitation-wavelength light quantity DB 126) for light quantity distribution of the fluorescent dye excited by a laser light other than the excitation source. Thereafter, the error formula generation unit 110 generates a calculation formula representing an error amount in the entire measurement result by using: relative binding rate distribution between the antigen and the antibody; relative intensity distribution of the light intensity of the fluorescent dye; photon shot noise distribution; distribution of a leakage amount of the fluorescence; and light quantity distribution of the fluorescent dye excited by other than the excitation source.

Subsequently, the simulation unit 112 executes simulation using the antigen expression amount distribution, the error amount calculation formula, and a random number (S104). Specifically, the simulation unit 112 uses distribution of an expression amount of each antigen for each measurement target cell, a calculation formula representing an error amount in the entire measurement result generated, and a random number, to perform Monte Carlo simulation to generate simulation data of the measurement result.

Thereafter, the simulation unit 112 classifies a measurement target cell population by clustering the generated simulation data of the measurement result (S105). Specifically, the simulation unit 112 determines which cell population corresponds to a peak or a cell population that appears in the simulation data of the measurement result.

Then, the information processing apparatus 10 presents the simulation result to the user via the output unit 106 (S106). Specifically, via the output unit 106, the information processing apparatus 10 outputs, to the user, information such as simulation data of the measurement result, a clustering result by the simulation unit 112, an error amount calculation formula, and measurement conditions to be a major error factor.

5.2. Second Example

Next, the second example of the information processing method will be described with reference to FIG. 8. The second example of the information processing method according to the present embodiment is a method of correcting a measurement result measured by the measurement unit 20, with use of a generated calculation formula representing an error.

As shown in FIG. 8, in the second example, first, the measurement sample S is measured by the measurement unit 20 (S111). Specifically, the measurement unit 20 detects scattered light and a fluorescence from each sample by irradiating each sample passing through the flow cell 23 with a laser light. Subsequently, the error formula generation unit 110 uses measurement conditions of the measurement sample S, to search various databases for error distribution corresponding to the measurement conditions (S112), and generates an error amount calculation formula on the basis of the searched error distribution (S113). Note that, since the method of generating the calculation formula representing an error amount is the same as that described in the first example, the description thereof is omitted here.

Subsequently, the data correction unit 104 corrects the measurement result acquired by the measurement unit 20, by using the generated calculation formula representing an error amount. Specifically, the data correction unit 104 may generate a measurement result from which an error is removed, by generating an inverse mapping of the calculation formula representing an error amount and processing a function representing a measurement result in the generated inverse mapping. Thereafter, the information processing apparatus 10 presents the measurement result from which the error has been removed, to the user via the output unit 106 (S115).

6. OPERATION EXAMPLE

Figure 9:
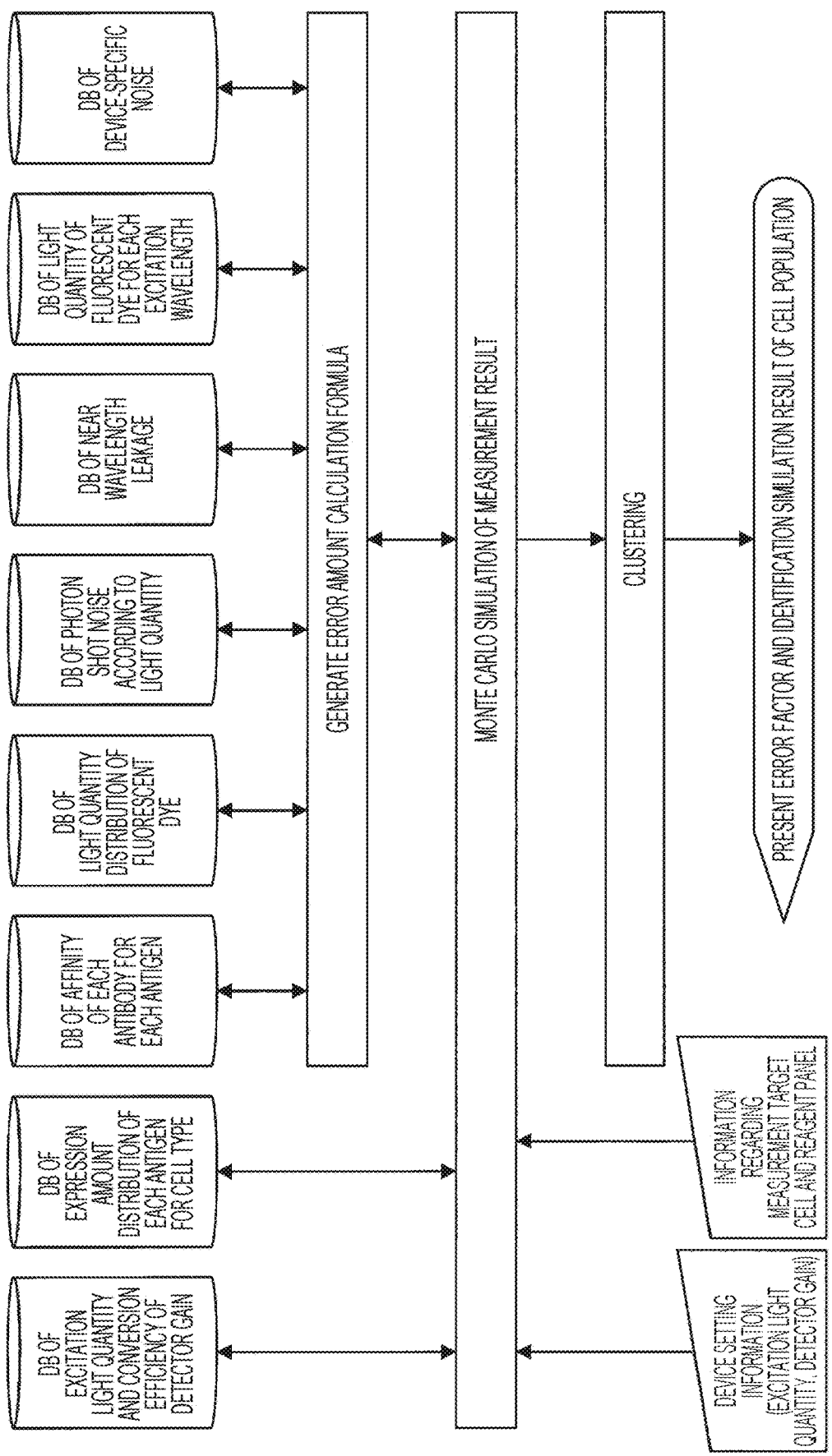
FIG. 9 is an explanatory view showing an operation example of the first example of the information processing method.

Subsequently, the first example of the information processing method will be described by exemplifying a more specific operation example with reference to FIG. 9. FIG. 9 is a block diagram for explaining an operation example of the first example of the information processing method.

As shown in FIG. 9, first, the information processing apparatus 10 generates a calculation formula representing an error amount in the entire measurement result, by using a database in which information regarding antibody affinity for an antigen is accumulated, a database in which information regarding light quantity distribution of a fluorescent dye is accumulated, a database in which information regarding photon shot noise according to a light quantity is accumulated, a database in which information regarding a leakage amount of a fluorescence from a fluorescent dye in a near wavelength is accumulated, a database in which information regarding a light quantity of a fluorescent dye for each excitation wavelength is accumulated, and a database in which information regarding device-specific noise of the measurement unit 20 is accumulated. Specifically, the information processing apparatus 10 searches these databases on the basis of the inputted measurement conditions, to extract relative binding rate distribution between the antigen and the antibody, relative intensity distribution of the light intensity of the fluorescent dye, photon shot noise distribution, distribution of a leakage amount of the fluorescence, light quantity distribution of the fluorescent dye excited by other than the excitation source, and device-specific noise of the measurement unit 20. Subsequently, the information processing apparatus 10 generates a calculation formula representing an error amount in the entire measurement result on the basis of the extracted various error distributions.

Next, the information processing apparatus 10 executes simulation of a measurement result by using the generated error amount calculation formula, device information of the measurement unit 20, information regarding a measurement target cell and a fluorescent labeling reagent, and the like. Specifically, the information processing apparatus 10 generates simulation data of the measurement result by performing Monte Carlo simulation using the generated error amount calculation formula, device-caused variation distribution in the measurement unit 20, antigen expression amount distribution for every cell, a type of a measurement target cell and a fluorescent labeling reagent, and a random number.

Here, the device-caused variation distribution in the measurement unit 20 is, for example, variations in an excitation light quantity and variations in conversion efficiency of a detector gain. The variations in excitation light quantity and the variation in conversion efficiency of the detector gain may be acquired by searching a database in which information regarding the excitation light quantity and conversion efficiency of the detector gain is accumulated, on the basis of device setting information of the measurement unit 20. The antigen expression amount distribution for every cell may be acquired by searching a database in which information regarding expression amount distribution of each antigen with respect to a cell type is accumulated, on the basis of a type of the measurement target cell. The type of the measurement target cell may be acquired by, for example, referring to information inputted from the user as the measurement target cell.

Subsequently, the information processing apparatus 10 classifies the measurement target cell for every cell population by clustering the generated simulation data of the measurement result. Specifically, the information processing apparatus 10 determines which cell population corresponds to a peak or a population that appears in the simulation data of the measurement result, and classifies the peak or the population of the measurement target cell into the corresponding cell population.

Moreover, the information processing apparatus 10 presents a simulation result, to the user, in which the cell population is identified by performing clustering and the like. At this time, in addition to the simulation result, the information processing apparatus 10 may present, to the user, information such as an error amount calculation formula and a measurement condition to be an error factor.

According to the operation example of the first example of the information processing method, the information processing apparatus 10 can generate a calculation formula representing an error amount of the entire measurement, in consideration of an error factor such as device-specific noise of the measurement unit 20. Furthermore, the information processing apparatus 10 can simulate a measurement result in consideration of an error factor such as variations and the like caused by device setting of the measurement unit 20. According to this configuration, the information processing apparatus 10 can obtain a simulation result with higher accuracy and precision.

7. HARDWARE CONFIGURATION

Figure 10:
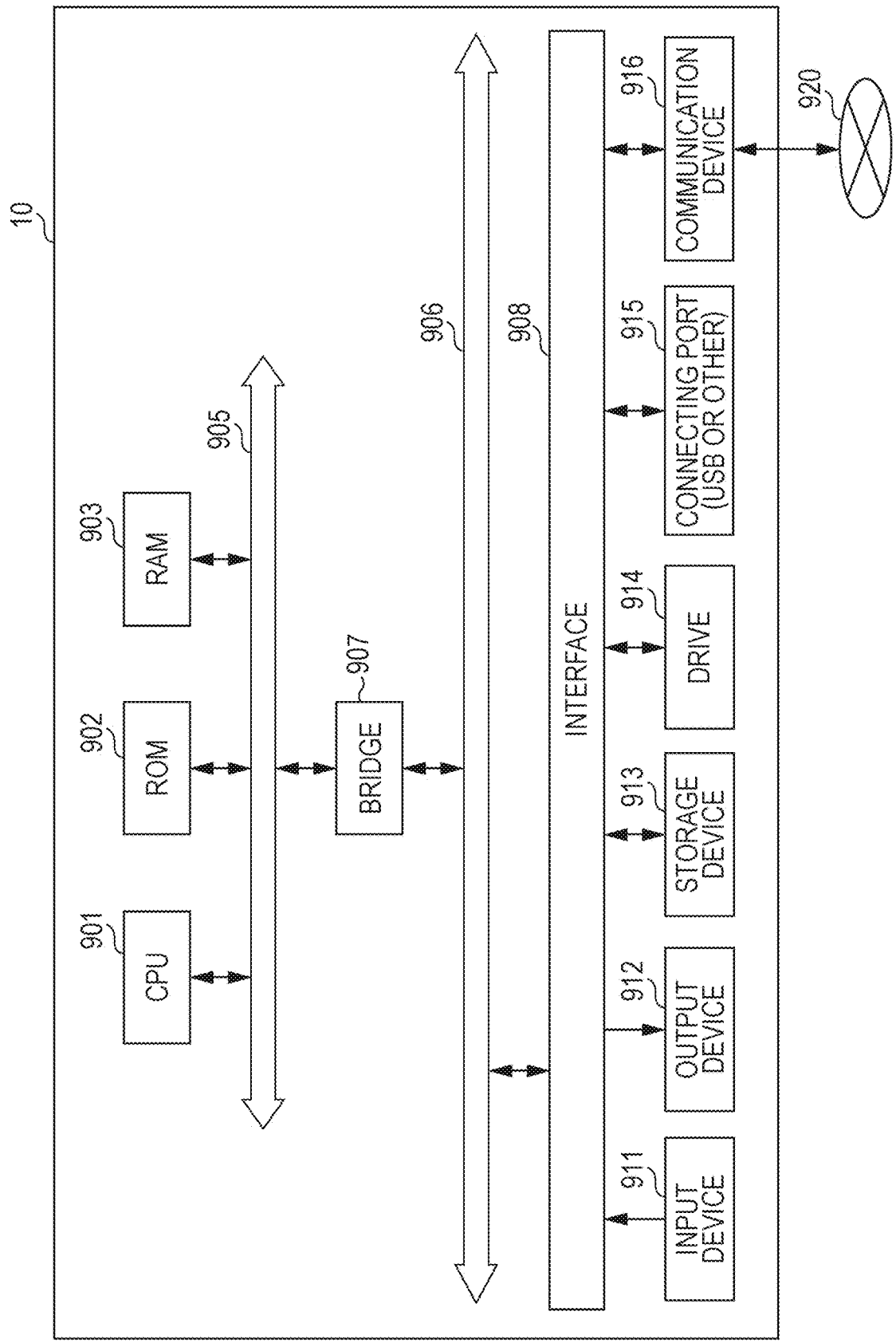
FIG. 10 is a block diagram showing an example of a hardware configuration of the information processing apparatus according to the present embodiment.

Next, a hardware configuration of the information processing apparatus 10 according to the present embodiment will be described with reference to FIG. 10. FIG. 10 is a block diagram showing an example of a hardware configuration of the information processing apparatus 10 according to the present embodiment.

As shown in FIG. 10, the information processing apparatus 10 includes a central processing unit (CPU) 901, a read only memory (ROM) 902, a random access memory (RAM) 903, a bridge 907, internal buses 905 and 906, an interface 908, an input device 911, an output device 912, a storage device 913, a drive 914, a connection port 915, and a communication device 916.

The CPU 901 functions as a computation processing device and a control device, and controls an overall operation of the information processing apparatus 10 in accordance with various programs stored in the ROM 902 and the like. The ROM 902 stores a program and operation parameters to be used by the CPU 901, and the RAM 903 temporarily stores a program to be used in the execution of the CPU 901, parameters that appropriately change in the execution, and the like. For example, the CPU 901 may execute functions of the data correction unit 104, the error formula generation unit 110, and the simulation unit 112.

The CPU 901, the ROM 902, and the RAM 903 are mutually connected by the bridge 907, the internal buses 905 and 906, and the like. Furthermore, the CPU 901, the ROM 902, and the RAM 903 are also connected to the input device 911, the output device 912, the storage device 913, the drive 914, the connection port 915, and the communication device 916 via the interface 908.

The input device 911 includes an input device to which information is inputted, such as a touch panel, a keyboard, a mouse, a button, a microphone, a switch, or a lever. Furthermore, the input device 911 also includes an input control circuit and the like to generate an input signal on the basis of the inputted information, and output to the CPU 901. For example, the input device 911 may execute a function of the input unit 114.

The output device 912 includes, for example, a display device such as a cathode ray tube (CRT) display device, a liquid crystal display device, or an organic electro-luminescence (EL) display device. Moreover, the output device 912 may include an audio output device such as a speaker or headphones. For example, the output device 912 may execute functions of the output unit 106 and the display control unit 108.

The storage device 913 is a memory device for data storage of the information processing apparatus 10. The storage device 913 may include a storage medium, a memory device that stores data in the storage medium, a reading device that reads data from the storage medium, and a deletion device that deletes stored data. For example, the storage device 913 may execute a function of the database storage unit 120.

The drive 914 is a reader/writer for a storage medium and is built in or externally attached to the information processing apparatus 10. For example, the drive 914 reads information stored in a removable storage medium such as a mounted magnetic disk, optical disk, magneto-optical disk, or semiconductor memory, and outputs to the RAM 903. The drive 914 can also write information to a removable storage medium.

The connection port 915 is a connection interface configured with, for example, a connection port for connection with an external connection device such as a universal serial bus (USB) port, an Ethernet (registered trademark) port, an IEEE 802.11 standard port, or an optical audio terminal.

The communication device 916 is a communication interface configured with, for example, a communication device and the like for connection with a network 920. Furthermore, the communication device 916 may be a wired or wireless LAN compatible communication device, or may be a cable communication device that performs wired cable communication. The communication device 916 and the connection port 915 may execute functions of the data acquisition unit 102 and the output unit 106.

Note that it is also possible to create a computer program for causing hardware such as the CPU, the ROM, and the RAM incorporated in the information processing apparatus 10 to exhibit a function equivalent to each configuration of the information processing apparatus according to the present embodiment described above. Furthermore, it is also possible to provide a storage medium storing the computer program.

8. CONCLUSION

As described above, the information processing apparatus 10 according to an embodiment of the present disclosure can use a database in which many measurement results and simulation results are accumulated, to generate a calculation formula that quantitatively represents an error amount that appears in the measurement result, on the basis of the measurement conditions.

According to this configuration, the information processing system 1 can obtain a measurement result with higher accuracy and precision by correcting an error in the measurement result. Furthermore, since the information processing system 1 can predict a measurement result with respect to the measurement condition by simulation, the measurement condition with a small error can be searched for by simulation. According to this configuration, the user can save a specimen, time, a reagent, and the like for examining the measurement conditions, and can obtain desired measurement data more efficiently.

The preferred embodiment of the present disclosure has been described above in detail with reference to the accompanying drawings, but the present technology is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

For example, in the embodiment described above, the information processing system 1 has been described as a cell analyzer, but the present technology is not limited to such an example. For example, the information processing system 1 may be a cell sorter including a cell separation unit.

Furthermore, the effects described in the present specification are merely exemplary or illustrative, and not restrictive. That is, the technology according to the present disclosure can exhibit other effects apparent to those skilled in the art from the description of the present specification, in addition to the effect described above or instead of the effect described above.

Note that the following configurations are also within the technical scope of the present disclosure.

(1)

An information processing apparatus including:

an extraction unit configured to extract each parameter variation that affects fluorescence intensity that is measured when a particle is irradiated with a light beam, from a database on the basis of a measurement condition; and a computation unit configured to generate a calculation formula representing an error amount included in the fluorescence intensity on the basis of the extracted each parameter variation.

(2)

The information processing apparatus according to (1) above, further including a data correction unit configured to correct the detected fluorescence intensity by using the calculation formula.

(3)

The information processing apparatus according to (1) or (2) above, further including a simulation unit configured to predict the fluorescence intensity by using the calculation formula.

(4)

The information processing apparatus according to (3) above, in which the simulation unit further performs classification on a type of the particle on the basis of the predicted fluorescence intensity.

(5)

The information processing apparatus according to (4) above, in which the simulation unit further evaluates validity of the classification.

(6)

The information processing apparatus according to (5) above, in which the simulation unit further evaluates validity of the measurement condition on the basis of the evaluated validity of the classification.

(7)

The information processing apparatus according to any one of (3) to (6) above, in which the simulation unit further evaluates a contribution degree of the each parameter variation to an error amount of the fluorescence intensity.

(8)

The information processing apparatus according to any one of (3) to (7) above, in which the simulation unit evaluates a degree of an error amount of the fluorescence intensity.

(9)

The information processing apparatus according to any one of (1) to (8) above, in which the computation unit generates the calculation formula on the basis of machine learning.

(10)

The information processing apparatus according to any one of (1) to (9) above, in which the particle includes a cell.

(11)

The information processing apparatus according to (10) above, in which the measurement condition includes at least one or more of a type of the cell, a type of an antigen that the cell has, a type of an antibody that binds to the antigen, or a type of a fluorescent dye that binds to the antibody.

(12)

The information processing apparatus according to (11) above, in which the parameter includes at least one or more of an expression amount of the antigen in the type of the cell, affinity of the antibody for the antigen, or a light quantity of the fluorescent dye.

(13)

The information processing apparatus according to (11) or (12) above, in which the particle individually emits a plurality of corresponding fluorescences by being irradiated with a plurality of light beams, and the parameter further includes at least any of an excitation amount of the fluorescent dye by a non-corresponding light beam, or mutual leakage of a plurality of fluorescences.

(14)

The information processing apparatus according to any one of (1) to (13) above, further including a flow cytometer unit configured to irradiate the moving particle with a light beam, and detect a fluorescence from the particle.

(15)

An information processing method including:
with use of a computation processing device,
extracting each parameter variation that affects fluorescence intensity that is measured when a particle is irradiated with a light beam, from a database on the basis of a measurement condition; and
generating a calculation formula representing an error amount included in the fluorescence intensity on the basis of the extracted each parameter variation.

(16)

A program for causing a computer to function as:
an extraction unit configured to extract each parameter variation that affects fluorescence intensity that is measured when a particle is irradiated with a light beam, from a database on the basis of a measurement condition; and
a computation unit configured to generate a calculation formula representing an error amount included in the fluorescence intensity on the basis of the extracted each parameter variation.

REFERENCE SIGNS LIST

S Measurement sample
1 Information processing system
10 Information processing apparatus
20 Measurement unit
21 Laser light source
23 Flow cell
25 Photodetector
102 Data acquisition unit
104 Data correction unit
106 Output unit
108 Display control unit
110 Error formula generation unit
112 Simulation unit
114 Input unit
120 Database storage unit

The invention claimed is:

1. An information processing apparatus comprising:
circuitry configured to function as:
an extraction unit configured to extract, from a database on a basis of a measurement condition, each parameter variation that affects fluorescence intensity, wherein the fluorescence intensity is measured when a particle is irradiated with a light beam, wherein the database includes error distribution corresponding to the measurement condition; and
a computation unit configured to generate, on a basis of the extracted each parameter variation, a calculation formula representing an error amount included in the fluorescence intensity.

2. The information processing apparatus according to claim 1, wherein the circuitry is further configured to function as:
a data correction unit configured to correct the detected fluorescence intensity by using the calculation formula.

3. The information processing apparatus according to claim 1, wherein the circuitry is further configured to function as:
a simulation unit configured to predict the fluorescence intensity by using the calculation formula.

4. The information processing apparatus according to claim 3, wherein the simulation unit further performs classification on a type of the particle on a basis of the predicted fluorescence intensity.

5. The information processing apparatus according to claim 4, wherein the simulation unit further evaluates validity of the classification.

6. The information processing apparatus according to claim 5, wherein the simulation unit further evaluates validity of the measurement condition on a basis of the evaluated validity of the classification.

7. The information processing apparatus according to claim 3, wherein the simulation unit further evaluates a contribution degree of the each parameter variation to an error amount of the fluorescence intensity.

8. The information processing apparatus according to claim 3, wherein the simulation unit evaluates a degree of an error amount of the fluorescence intensity.

9. The information processing apparatus according to claim 1, wherein the computation unit generates the calculation formula on a basis of machine learning.

10. The information processing apparatus according to claim 1, wherein the particle includes a cell.

11. The information processing apparatus according to claim 10, wherein the measurement condition includes at least one or more of a type of the cell, a type of an antigen that the cell has, a type of an antibody that binds to the antigen, or a type of a fluorescent dye that binds to the antibody.

12. The information processing apparatus according to claim 11, wherein the parameter includes at least one or more of an expression amount of the antigen in the type of the cell, affinity of the antibody for the antigen, or a light quantity of the fluorescent dye.

13. The information processing apparatus according to claim 11, wherein
the particle individually emits a plurality of corresponding fluorescences by being irradiated with a plurality of light beams, and
the parameter further includes at least any of an excitation amount of the fluorescent dye by a non-corresponding light beam, or mutual leakage of a plurality of fluorescences.

14. The information processing apparatus according to claim 1, wherein the circuitry is further configured to function as:
a flow cytometer unit configured to:
irradiate the moving particle with a light beam, and
detect a fluorescence from the particle.

15. An information processing method comprising:
with use of a computation processing device:
extracting, from a database on a basis of a measurement condition, each parameter variation that affects fluorescence intensity, wherein the fluorescence intensity is measured when a particle is irradiated with a light beam, wherein the database includes error distribution corresponding to the measurement condition; and
generating, on a basis of the extracted each parameter variation, a calculation formula representing an error amount included in the fluorescence intensity.

16. A non-transitory storage medium encoded with instructions that, when executed by a computer, execute processing comprising:
extracting, from a database on a basis of a measurement condition, each parameter variation that affects fluorescence intensity, wherein the fluorescence intensity is measured when a particle is irradiated with a light beam, wherein the database includes error distribution corresponding to the measurement condition; and generating, on a basis of the extracted each parameter variation, a calculation formula representing an error amount included in the fluorescence intensity.

* * * * *